April 15, 1952     G. W. CURTIS     2,592,542
ENDLESS TRACK

Filed Dec. 16, 1946     2 SHEETS—SHEET 1

INVENTOR.
George W. Curtis
BY Morsell & Morsell
ATTORNEYS.

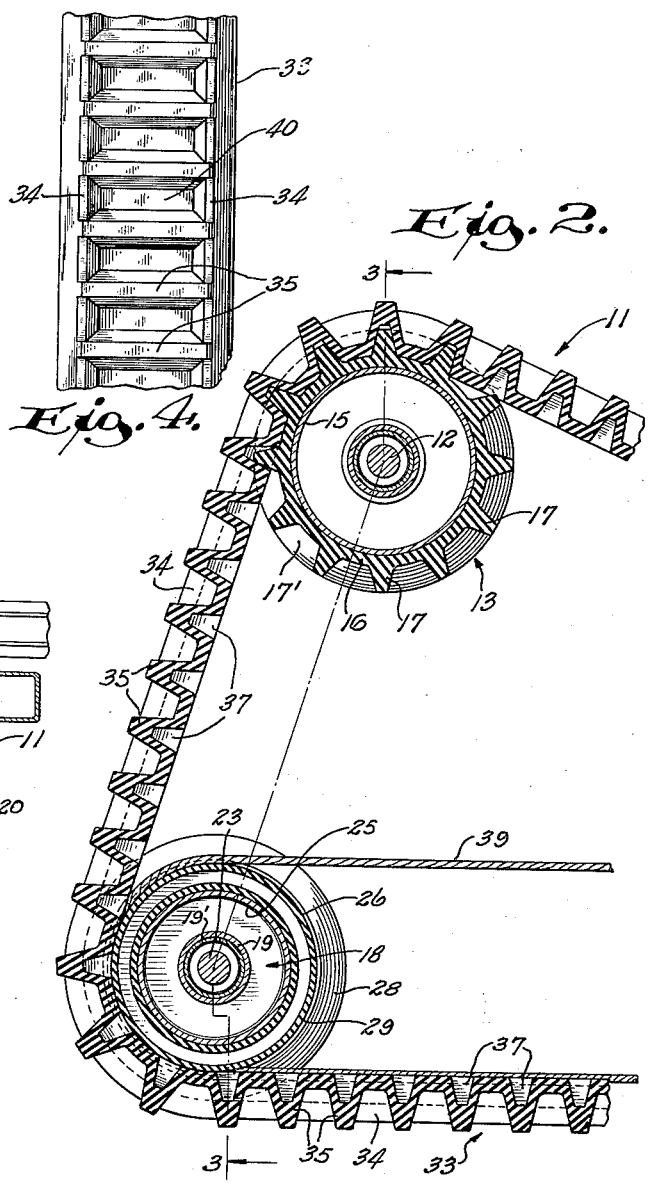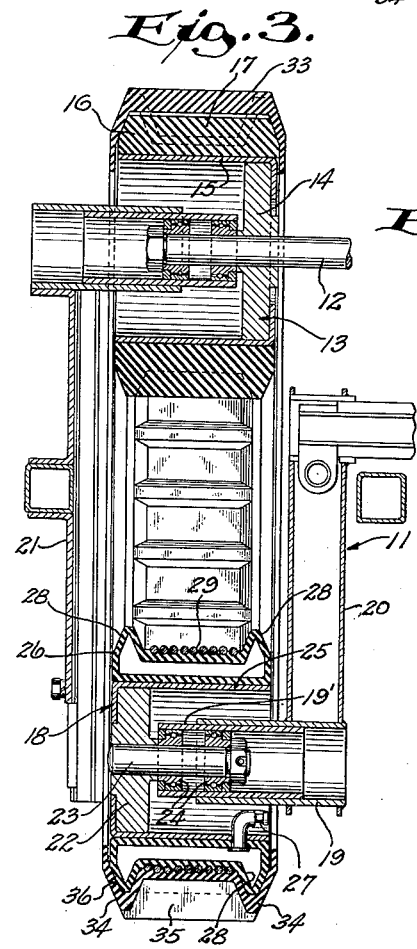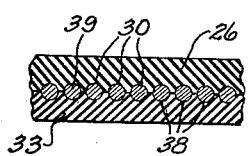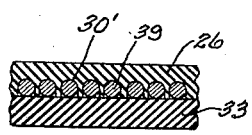
April 15, 1952     G. W. CURTIS     2,592,542
ENDLESS TRACK
Filed Dec. 16, 1946     2 SHEETS—SHEET 2
INVENTOR.
George W. Curtis
BY Morsell & Morsell
ATTORNEYS.

Patented Apr. 15, 1952

2,592,542

UNITED STATES PATENT OFFICE 2,592,542

ENDLESS TRACK

George W. Curtis, Wauwatosa, Wis.

Application December 16, 1946, Serial No. 716,652

11 Claims. (Cl. 305—10)

This invention relates to improvements in endless tracks.

It is a general object of the present invention to provide an endless track construction including an endless ground engaging member of flexible molded material which is so designed that it may be efficiently driven in a positive manner, said design also serving to form an efficient tread pattern which will provide a high traction co-efficient even in loose or sandy soil.

A further object of the invention is to provide improved means for maintaining proper tension in the ground engaging stretch of the track.

A more specific object of the invention is to provide an endless track wherein there are grooves on the inner side of the endless member which cooperate with a driving sprocket, the said grooves being translated into ribs on the outer side of the endless member and said ribs being so arranged as to produce an efficient traction result.

A further, specific object of the invention is to provide improved means in the form of endless members movable within the ground engaging stretch of the endless track to back up and reinforce the latter, together with means such as pneumatic tires on the idler rollers for maintaining said endless members under a desired tension and for simultaneously maintaining a proper tension in the ground engaging stretch of the track.

With the above and other objects in view, the invention consists of the improved endless track, and all its parts and combinations, as set forth in the claims, and all equivalents thereof.

In the accompanying drawings, illustrating one complete embodiment of the preferred form of the invention, in which the same reference numerals designate the same parts in all of the views:

Fig. 2 is a fragmentary vertical sectional view of the endless track illustrating the driving sprocket and one of the idler rollers;

Fig. 3 is a sectional view taken approximately on the line 3—3 of Fig. 2;

Fig. 4 is a fragmentary plan view of the outer side of the track illustrating the tread pattern;

Fig. 5 is an enlarged fragmentary transverse sectional view through a portion of the track and idler roller to illustrate the reinforcing cables, and Fig. 6 is a view similar to Fig. 5 showing a modified arrangement.

Figure 1:
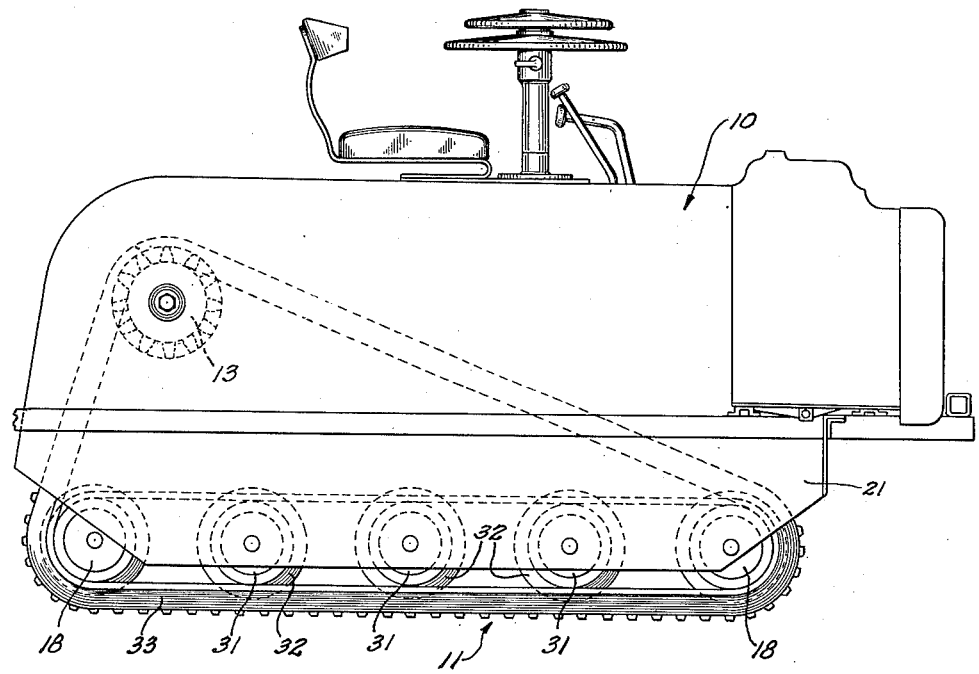
Fig. 1 is a side elevational view of a tractor of the type illustrated in my co-pending application, Serial No. 691,272, filed August 17, 1946, and showing the improved endless track associated therewith.

Referring more particularly to the drawings, the numeral 10 designates a tractor of the type illustrated in my co-pending application, Serial No. 691,272, filed August 17, 1946. On each side of the tractor is an endless track unit 11; and power from the power plant of the tractor is transmitted through shafts 12 to driving sprockets 13 on each side, preferably in the manner described in the beforementioned pending application. Each sprocket wheel includes a supporting disc 14 mounted for rotation with its shaft 12. Each disc is positioned rigidly within a cylinder 15 and is so connected thereto as to cause rotation of the cylinder when the disc is rotated. The cylinder has attached thereto an annular toothed part 16, and the latter is preferably formed of "Neoprene" or similar material molded to produce spaced transverse sprocket teeth 17 extending transversely between spaced annular ribs 17'. The sprocket wheels may, of course, be formed in other ways and of other materials.

Suitably supported for rotation around tubular trunnions 19' are end rollers 18. Each tubular trunnion may be telescopically positioned in a sleeve 19 projecting from the lower portion of a subframe 20, the latter being suitably connected to a frame portion 21 of the tractor.

The end rollers 18 each include a disc 22 rigidly mounted on one end of a stud 23. Each stud 23 is rotatable concentrically of the tubular trunnions 19' within bearing sets 24. Around each disc 22 and rigidly connected thereto is a cylinder 25. Each cylinder is equipped with a small pneumatic tire 26 having an air valve 27. The tire is so shaped as to provide a peripheral rib 28 on each side with an annular depressed area 29 therebetween. The latter area is formed with a plurality of parallel peripheral grooves 30 (see Fig. 5). The tires may be made of any suitable rubber or synthetic material. Suitably supported intermediate rollers 31 (see Fig. 1) may be utilized as required. These rollers are equipped either with solid or pneumatic tires 32, with said tires having the same outside size and shape as the pneumatic tires 26 of Fig. 3.

Movable around the rollers 18 and 31 and driven by a sprocket wheel 13 in an endless track 33 on each side of the tractor. Each track is preferably formed of a suitable rubber or rubber-like material which has been molded to provide on its outer side spaced longitudinal ribs 34 and spaced transverse ribs 35. The transverse ribs preferably project beyond the outermost portions of the longitudinal ribs 34 as is clear from Figs. 2 and 3. Each of the longitudinal ribs 34 is hollow to provide a longitudinal groove 36 on the inner side of the endless track. Likewise, the transverse ribs 35 are hollow to provide transverse grooves 37 on the inner side.

Between the longitudinal grooves 36 the inner side of the track is formed with a plurality of small parallel annular grooves 38 (see Fig. 5) which cooperate with the grooves 30 in the tires of the idler rollers 18 and 31 to receive and guide a plurality of metal cables 39. These cables are endless and extend around the end rollers 18 as is clear from Figs. 1 and 2. It is also entirely practical to have grooves in the tire only rather than in both the tire and endless track. This is illustrated by the grooves 30' of Fig. 6 which accommodate the metal cables 39. If desired, other endless reinforcing means for the ground laying stretch of the endless track may be employed such as the metal band of my application, Serial No. 477,559, filed March 1, 1943, now Patent 2,416,679, issued March 4, 1947. The cables of the present invention, however, have advantages over the metal band and are less expensive.

The cross-sectional shape of the longitudinal grooves 36 on the inner side of the endless track is such as to match the cross-sectional shape of the annular ribs 17' of the sprocket 13 and is such as to match the annular ribs 28 of the tires on the end rollers as well as the corresponding annular ribs on the intermediate rollers 31. Furthermore, the spacing between the longitudinal grooves 36 on the inner side of the endless track is the same as the spacing between the pair of ribs 17' on the driving sprocket 13, and is the same as the spacing between the annular ribs 28 on the tires 26 as is clear from Fig. 3. In addition, the cross-sectional shape of the transverse grooves 37 on the inner side of the track is such as to match the cross-sectional shape of the sprocket teeth 17. The spacing between the grooves 37 is such with respect to the peripheral spacing of the sprocket teeth 17 as to cause the teeth to mesh with the grooves as is illustrated in Fig. 2.

The annular ribs 17' on the sprocket wheels 13 provide additional driving contact. The use of V-grooves in the inner side of the endless track, together with V-ribs on the sprocket wheels, provides a driving arrangement wherein the outermost portions of the teeth 17 and the outermost portions of the ribs 17' have substantially the same radius and peripheral speed. Thus, there is no slippage.

In use of the improved endless track, the tires 26 on the end rollers 18 are first inflated through valves 27 for the purpose of placing the steel cables 39 under a desired tension. This prevents the cables from buckling or bending when subjected to vertical forces and provides a stiffened support for the ground engaging stretch of the endless track. At the same time the inflation of the tires increases the tension on the endless track proper. The steel cables are received in the longitudinal grooves to back up the ground engaging stretch of the track, as is clear from Figs. 2, 3, 5 and 6, and thus prevent the track from buckling or bending as a result of forces acting vertically.

After the tractor has been started and the driving shafts 12 are rotating, this will impart rotation to the sprocket wheels 13, and the latter will drive the endless tracks, there being an efficient engagement between the transverse teeth 17 and the transverse grooves 37 and between the ribs 17' and the grooves 36.

The use of the transverse grooves 37 and the longitudinal grooves 36 on the inner side of the track not only improves the drive by bringing about more efficient cooperation with the sprocket wheels, but these grooves also create the external ribs 34 and 35 on the outer side of the track. These ribs make a tread pattern which is characterized by rectangular depressions 40 (see Fig. 4) which effectively confine the soil and prevent it from flowing sideways during operation. Thus, the endless track presses down, compacts and confines the soil and thus tends to increase the resistance of the soil to shearing forces, and insures that all of the tractive effort is employed for useful purposes rather than for the purpose of causing the soil to flow sidewise with the resulting formation of a ditch in the ground. The ribs 34 and 35 will penetrate all types of soil including soft soil such as sand or loam, to produce good traction regardless of conditions.

Although only one form of the invention has been shown and described, various changes and modifications may be made without departing from the spirit of the invention, and all of such changes are contemplated as may come within the scope of the claims.

What I claim is:

1. An endless track for use in a track laying unit having a driving member provided with driving teeth, said track being formed of flexible molded material and having on its outer side spaced hollow, transversely extending ribs, there being driving tooth receiving grooves on the inner side of said track formed by the interiors of said hollow ribs, and retaining means adjacent the ends of said grooves for preventing lateral displacement of said track relative to a driving member.

2. An endless track for use in a track laying unit having a driving member provided with driving teeth, said track being formed of flexible molded material and having on its outer side spaced hollow ribs, there being driving tooth receiving recesses on the inner side of said track which are formed by the interiors of said hollow ribs.

3. An endless track for use in a track laying unit having a driving member provided with driving teeth, said track being formed of flexible molded material and having an outer surface portion with spaced hollow transversely extending ribs projecting outwardly from said outer surface portion, there being driving tooth receiving recesses on the inner side of the track which project outwardly beyond said outer surface portion of the outer side of the track, said recesses being formed by the interiors of said hollow ribs.

4. An endless track for use in a track laying unit having a driving member provided with driving teeth, said track being formed of flexible molded material and having on its outer side spaced hollow transversely extending ribs, there being driving tooth receiving recesses on the inner side of said track which are formed by the interiors of said hollow ribs.

5. An endless track for use in a track laying unit having a driving member provided with driving teeth, said track being formed of flexible molded material and having on its outer side at least one rib, there being driving tooth receiving recesses formed on the inner side of said track and projecting into said rib.

6. An endless track for use in a track laying unit having a driving member provided with driving teeth, said track being formed of flexible molded material and having an outer surface portion formed with ribs projecting outwardly therefrom, there being driving tooth receiving recesses on the inner surface of said track which project outwardly beyond said outer surface portion of the track into said ribs.

7. An endless track for use in a track laying unit having a driving member provided with driving teeth, comprising: an endless elongated member of flexible molded material having on its outer side spaced hollow ribs, there being outer surface portions between said ribs, and there being driving tooth receiving recesses on the inner side of said member which extend into the material of said member a distance beyond said outer surfaces, said recesses comprising the interiors of said hollow ribs.

8. An endless track for use in a track laying unit having a driving member provided with driving teeth, comprising: an endless elongated member of flexible molded material having on its outer side spaced hollow transversely extending ribs, there being outer surface portions between said ribs, and there being driving tooth receiving recesses on the inner side of said member which extend into the material of said member a distance beyond said outer surfaces, said recesses comprising the interiors of said hollow ribs.

9. A track for use in a track laying unit of a type having a circular driving member provided with peripheral driving teeth and with a circumferentially extending peripheral rib, comprising: an endless elongated member of flexible molded material having its outer side formed with a hollow longitudinal rib and with spaced hollow transverse ribs, said member having tooth receiving recesses on its inner side formed by the interiors of said hollow transverse ribs, and member also having a longitudinal recess on its inner side formed by the interior of said hollow longitudinal rib, said longitudinal recess being adapted to receive the circumferential rib of the driving member.

10. A track for use in a track laying unit having a circular driving member provided with peripheral driving teeth and with a circumferentially extending annular rib, comprising: an endless elongated member of flexible molded material having its outer side formed with an endless hollow longitudinal rib and with spaced hollow transverse ribs, said member having tooth receiving recesses on its inner side formed by the interiors of said hollow transverse ribs, and said member also having an endless longitudinal recess on its inner side formed by the interior of said hollow longitudinal rib, said longitudinal recess being adapted to receive the annular circumferential rib of the driving member.

11. A track for use in a track laying unit having a circular driving member provided with peripheral driving teeth and with a circumferentially extending peripheral rib, comprising: an endless elongated member of flexible molded material having an outer surface portion formed with a longitudinal rib and with spaced transverse ribs, said member having an inner surface portion formed with tooth receiving recesses which project outwardly into said transverse ribs and beyond said outer surface portion, and said member also having a longitudinal recess formed in its inner surface portion, said recess projecting outwardly into said longitudinal rib and beyond said outer surface portion, said longitudinal recess being adapted to receive the circumferential rib of the driving member.

GEORGE W. CURTIS.

REFERENCES CITED

The following references are of record in the file of this patent:

UNITED STATES PATENTS

| Number | Name | Date |
| --- | --- | --- |
| Re. 22,730 | Meyers | Mar. 5, 1946 |
| 1,911,546 | Berger | May 30, 1933 |
| 2,162,198 | Herrington | June 13, 1939 |
| 2,303,945 | Mayne et al. | Dec. 1, 1942 |
| 2,416,679 | Curtis | Mar. 4, 1947 |

FOREIGN PATENTS

| Number | Country | Date |
| --- | --- | --- |
| 457,245 | Germany | Mar. 10, 1928 |